(12) United States Patent (10) Patent No.: US 9,274,510 B2
Burger et al. (45) Date of Patent: Mar. 1, 2016

(54) LIGHT GRID AND METHOD OF MONITORING A MONITORED ZONE

(71) Applicant: SICK AG, Waldkirch (DE)

(72) Inventors: Jurgen Burger, Waldkirch (DE); Stefan Kienzler, Waldkirch (DE)

(73) Assignee: SICK AG, Waldkirch (DE)

( * ) Notice: Subject to any disclaimer, the term of this patent is extended or adjusted under 35 U.S.C. 154(b) by 329 days.

(21) Appl. No.: 14/038,058

(22) Filed: Sep. 26, 2013

(65) Prior Publication Data

US 2014/0091898 A1 Apr. 3, 2014

(30) Foreign Application Priority Data

Sep. 28, 2012 (EP) ..................................... 12186667

(51) Int. Cl.
*G05B 9/02* (2006.01)
*G01V 8/18* (2006.01)
*G01D 5/26* (2006.01)
*F16P 3/14* (2006.01)
(Continued)

(52) U.S. Cl.
CPC ... *G05B 9/02* (2013.01); *F16P 3/14* (2013.01); *F16P 3/144* (2013.01); *G01V 8/20* (2013.01); *G10K 15/02* (2013.01)

(58) Field of Classification Search
CPC ............. G01V 8/18; G01V 8/20; G01D 5/26; F16P 3/14
USPC .................. 340/3.1, 556, 508, 506, 541, 555, 340/573.1, 599; 250/222.1, 208.4, 221; 250/214; 187/317
See application file for complete search history.

(56) References Cited

U.S. PATENT DOCUMENTS

| 3,805,061 A | 4/1974 | De Missimy et al. |
| 5,130,532 A | 7/1992 | Clemens |
| 5,567,931 A | 10/1996 | Amend et al. |

(Continued)

FOREIGN PATENT DOCUMENTS

| DE | 4324590 A1 | 1/1995 |
| DE | 102007024210 A1 | 11/2008 |

(Continued)

OTHER PUBLICATIONS

European Search Report in the Counterpart Application No. 12186667.7, dated Mar. 26, 2013, seven (7) pages.

*Primary Examiner* — Nam V Nguyen
(74) *Attorney, Agent, or Firm* — Nath, Goldberg & Meyer; Jerald L. Meyer; Rury L. Grisham

(57) ABSTRACT

A light grid (10) is provided having a plurality of light transmitters (14) for transmitting a respective monitoring light beam (38) and having a plurality of associated light receivers (22) to generate an objection detection signal (42*a-d*) depending on the reception of the monitoring light beam, having a control (30, 32) which is configured to divide the monitoring light beams (30) into groups and to consecutively activate the monitoring light beams (38) of the groups, wherein, in a group-wise parallel monitoring sequence, a respective monitoring light bream (34) of each group is activated in parallel, as well as having a first bus (34) over which the object detection signals can be output to the control (32) by the light receivers (26, 26). The light receivers (22, 26) are in this respect configured to output the object detection signals to the control (32) in a time multiplex process.

14 Claims, 3 Drawing Sheets

(51) Int. Cl.
*G01V 8/20* (2006.01)
*G10K 15/02* (2006.01)

(56) References Cited

U.S. PATENT DOCUMENTS

| | | | |
|---|---|---|---|
| 6,236,036 B1 | 5/2001 | Kudo et al. | |
| 6,872,932 B2 * | 3/2005 | Emmanuel | G01V 8/20 250/221 |
| 6,894,623 B2 * | 5/2005 | Hama | F16P 3/14 250/221 |
| 6,958,465 B2 * | 10/2005 | Haberer | G01V 8/20 209/586 |
| 7,183,533 B2 * | 2/2007 | Osako | G01D 5/26 187/317 |
| 7,326,914 B2 * | 2/2008 | Pirkl | G01V 8/20 250/221 |
| 7,343,062 B1 * | 3/2008 | Dogul | G01V 8/18 385/12 |
| 7,741,595 B2 * | 6/2010 | Lohmann | G01V 8/20 250/221 |
| 7,960,681 B2 * | 6/2011 | Carnicelli | G01V 8/20 250/221 |
| 8,058,605 B2 * | 11/2011 | Scheiber | F16P 3/14 250/208.4 |
| 9,128,201 B2 * | 9/2015 | Burger | G01V 8/20 |

FOREIGN PATENT DOCUMENTS

| | | |
|---|---|---|
| DE | 202007014387 U1 | 2/2009 |
| EP | 1903356 A1 | 3/2008 |

* cited by examiner

LIGHT GRID AND METHOD OF MONITORING A MONITORED ZONE

BACKGROUND

Technical Field

The invention relates to a light grid and to a method of monitoring a monitored zone having a plurality of monitoring light beams in accordance with the preamble of claims 1 and 16 respectively.

A light grid in principle comprises a plurality of light barriers arranged in parallel with one another. It accordingly recognizes objects using beam interruption. In this respect, as a rule, the transmitters and the receivers are combined in a respective common bar-shaped housing; they are disposed opposite one another and span a two-dimensional monitored field via the plurality of parallel monitoring beams.

Objects can be measured using a light grid in that it is determined which beams are interrupted when an object passes through the monitored field. Light grids are also used in safety technology to initiate a safety measure, for instance the switching off of a monitored machine, in response to an unauthorized intrusion into the monitored field. Light grids in the first use group are also called automation light grids; in the second use group safety light grids.

The individual monitoring beams can practically not be bundled so much and be aligned so exactly that they also radiate over only exactly the associated light receiver at larger spacings between the two rod-shaped housings. Instead, they form so-called lobes having a cross-section in which the associated light receiver lies as well as its neighbors. In order nevertheless to obtain the clear association between the light transmitter and the light receiver and in order to prevent an object in the beam path from being overlooked because the responsible light receiver is located in the transmitted light lobe of a non-associated light transmitter, the monitoring light beams are conventionally operated cyclically. In this respect, only respective pairs of a light transmitter and its associated light recover are simultaneously activated consecutively, usually as a rule from top to bottom or vice versa. After such an activation cycle, it is then clearly known whether an object is located between a light transmitter and its light receiver and which is the respective pair.

There is only a real-time evaluation without an activation cycle in exceptional cases, for instance with frame light grids. In this respect, the switching state of the individual monitoring beams is linked with a logical OR, i.e. the light grid switches when any monitoring beam is interrupted. A statement on the interruption location is not possible in this respect.

The response time, switching frequency and repetition precision of the light grid result from the cycle time, that is from the time until all monitoring beams have been activated once. The cycle time is consequently determined as the product of the evaluation time of a monitoring beam and the number of beams. If the number of beams is increased, the cycle time increases with a correspondingly negative influence on the named parameters and the application. If the number of beams becomes large, with several hundred easily being conceivable, this effect becomes problematic. The cycle time can then only be reduced by use of higher transmission bandwidths, but this is a great disadvantage with respect to manufacturing costs and sensitivity.

The signals of the different light receivers are collected centrally, for example in a microprocessor, to evaluate which beams are interrupted. For this purpose, corresponding connections are required between the light receivers and the microprocessor.

An optoelectronic sensor is known from DE 10 2007 024 210 A1 for securing a danger zone in which the transmission beams are generated sequentially section-wise. This means that the transmission beams are generated with respect to only one section of the sensor consecutively in time and exclusive of one another. Every such section corresponds to a module with which a separate evaluation circuit is associated. The evaluation circuits are in turn connected to a bus connection in parallel with one another. Conflicts on the bus in which a plurality of monitoring beams simultaneously want to report an interruption are avoided by the modular evaluation. In addition DE 10 2007 024 210 A1 deals with a safety light grid where it is irrelevant which beam is interrupted since a safety-directed switch-off signal is output independently of the location of the intrusion. It would therefore not be harmful if two evaluation circuits attempt to simultaneously transmit a switch-off signal over the bus.

EP 1 903 356 A1 also discloses a light grid in which a bus is connected to the evaluation unit and to all reception elements. Since a conventional cycle is used here with sequential activation of all light beams, simultaneous accesses to the bus by a plurality of light reception elements which want to communicate a beam interruption cannot occur.

Transparent objects represent a special challenge in the recognition of a beam interruption. This is due to the fact that the switching threshold has to be set very closely to the level for a free light path since the transparent object, unlike an opaque object, also still transmits a substantial portion of the transmission light when it is located in the beam path. The tight setting of the switching threshold is very critical because the reception levels do not remain stable due to aging, contamination or temperature influences. The availability of such sensors is thereby very limited.

So-called glass light barriers are known in the prior art for the case with only one beam, that is in the light barrier environment, which check their current reception level with a free light path sporadically by comparing an analog measurement value with an initialization value. If a dropping of the reception level is determined, the switching threshold is correspondingly adapted. This check takes place in a time-based process after specific time intervals or in an event-based process whenever the light barrier changes into the state light path free after an object intrusion.

The effort for the threshold check in the control is very high and the level check would have to be carried out individually for every beam in a light grid. In addition, the normal switching state analysis has to be briefly interrupted for the measurement of the analog values, whereby the response time is also increased independently of the effort. This is not practical overall and conventional light grids are therefore not able reliably to detect transparent objects.

SUMMARY OF INVENTION

It is therefore the object of the invention to achieve a shorter cycle time with less effort. In addition, the light grid should preferably also be able to recognize transparent objects.

This object is satisfied by a light grid and by a method of monitoring a monitored region having a plurality of monitoring light beams in accordance with claims 1 and 16 respectively. In this respect, the invention starts from the basic idea of transmitting the object detection signals of the individual monitoring light beams over a bus to a control and to prevent any conflicts by beam interruptions to be communicated simultaneously in time via a time multiplexing. It is thereby made possible to activate a plurality of monitoring light beams in parallel and to restrict the usual activation cycle to groups. The cycle time is therefore no longer determined by the total number of monitoring light beams, but only by the number of monitoring light beams per group which is substantially smaller in dependence on the group size. In this respect, activation of a monitoring light beam means that a light transmitter and the associated light receiver are activated simultaneously for a specific length of time to determine whether an object is located in the monitoring light beam thereby spanned.

The light grid in accordance with the invention accordingly shows the conventional basic structure in which a respective pair of light transmitter and light receiver form a monitoring light beam similar to a light barrier. The monitoring light beams in their totality in turn are preferably, but not necessarily, parallel with and equidistant from one another in a common plane and thus form a monitored region. The evaluation of the monitoring light beams in this respect takes place with respect to the beam and in a decentralized manner in the light receiver, on the one hand, and for all monitoring light beams in an overriding manner in the central control. For this purpose, the light receiver preferably also has a level evaluation related to this beam, for example in the form of an ASIC, in addition to the actual light reception element in the form of a photodiode or the like.

The invention has the advantage that the cycle time of the total light grid, that is the time after which all monitoring light beams have been activated once, can be substantially shortened. This is possible to the degree in which mutual optical influencing by monitoring light beams of different groups is no longer present, which can easily be ensured in the most varied group associations in light grids with a number of monitoring light beams. The cycle time for an individual beam, which could only be reduced with a high effort and while losing sensitivity, can remain unchanged in this respect. The effort for the communication of the object detection signals to the control remains extremely small and bus conflicts are avoided in a simple manner.

The first bus preferably has only a 1-bit line for object detection signals. The bandwidth of the data line is accordingly reduced to a minimum, but is also sufficient for transmitting the simultaneously determined object detection signals due to the time multiplexing in accordance with the invention. Less cabling effort is required and simple bus connections at the light receivers and the control are sufficient.

The object detection signal is preferably a switching pulse. It is thus a binary signal which can be transmitted with only one bit bandwidth. The object detection signal is also called a switching signal in an analog manner to the switching light barriers.

The time multiplex process is preferably implemented by a delay applied to the switching pulse. This implements the time multiplexing in a simple manner without a higher instance time having to assign time slots. The delay is preferably a delay common to all monitoring light beams of a group and differing between the groups. Each group therefore has a delay assigned to it by which the object detection signal is transmitted to the control without overlap with other groups. It is thereby ensured that, with a group-wise parallel monitoring sequence, each light receiver can output its object detection signal over the bus to the control free of collision.

The object detection signal is preferably acquired by comparing the reception intensity of the monitoring light beam in the light receiver with a switching threshold. This is a simple and robust possibility of detecting a beam interruption. The switching threshold is preset in the light receivers or is taught at the start. The value of the switching threshold should be set so that it is recognized with a certain function reserve when the expected reception intensity for a free beam path is fallen below because an object at least partly covers the monitoring light beam.

The control is preferably configured to track the switching threshold dynamically. It is determined for this purpose whether the received intensity of the monitoring light beam has changed significantly with a free beam path with respect to a previously or initially measured value, for example due to contamination, temperature influences or aging. A threshold tracking is particularly useful or even necessary for the recognition of transparent objects since here the intensity difference between the free monitoring light beam and the interrupted monitoring light beam is particularly small so that the switching threshold is set close to the reception intensity of the free monitoring light beam and is thus very sensitive toward drifting.

The light receivers are preferably configured to recognize a dropping of the reception level with a free light path using a threshold comparison of the reception intensity of the monitoring light beam with a prefailure threshold. It can be easily recognized with reference to the prefailure threshold whether the reception level is still sufficient or whether the switching threshold is still close enough to the reception level of the free beam path in order also reliably to recognize transparent objects.

The light receivers are preferably configured to output the dropping of the reception level with a free light path as a binary prefailure signal in dependence on the result of the threshold comparison. In a similar manner to the switching event, the prefailure report or the signal for adapting the thresholds is also processed as a simple binary signal which can be obtained, communicated and evaluated in a particularly simple manner.

The control is configured to accumulate the binary prefailure signals, in particular per monitoring light beam, in a counter and to adapt the switching threshold and/or the prefailure threshold if a preset count is exceeded or fallen below. In this respect, the counter is decremented once for a binary zero of the counter and is incremented once for a binary one. With merely statistical changes, the counter fluctuates by zero, but drifts toward the default prefailure count when the reception level changes systematically. An adaptation or tracking of the thresholds then takes place in the direction of the systematic deviation and to a degree which corresponds with the default counter level. The signal value for a free monitoring light beam can thus be monitored for beam interruption with only a simple 1-bit value per beam in each measurement. In the evaluation of the light receivers, only a threshold comparison is required for this purpose and only a counting function in the control, whereby the effort is dramatically reduced with respect to a conventional threshold tracking in a glass light barrier which would be too slow and in this respect also would also require large processing capacity. The information obtained with the prefailure threshold is so-to-say delivered along with the measurement anyway required for the detection of beam interruptions so that the response time remains unchanged. The distinction between time-based processes and result-based processes usual for glass light barriers is dispensed with. The regulation speed can be parameterized via the default count.

A second bus is preferably provided to communicate the prefailure signal from the light receivers to the control, in particular using only a 1-bit line for the prefailure signal. The prefailure signal for the counter in the control is thus also transmitted with little effort in an analog manner to the transmission of the object detection signals. In this respect, a bus line having only a one-bit data bandwidth is sufficient for the binary prefailure signal.

The first bus and the second bus are preferably configured as a common bus. Bus connections and the bus control can thus be used in common.

Even more preferably the common bus for the communication of the object detection signal and of the prefailure signal only has a single 1-bit line in that the object detection signal and the prefailure signal are given a different time offset. The first and second buses thus completely correspond to one another and a single data line having a bandwidth of only one bit is sufficient overall for the communication of the object detection signal and the prefailure signal. A double multiplexing practically takes place in order, on the one hand, to separate the signals of different groups and, on the other hand, to separate the object detection signal and the prefailure signal from one another.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
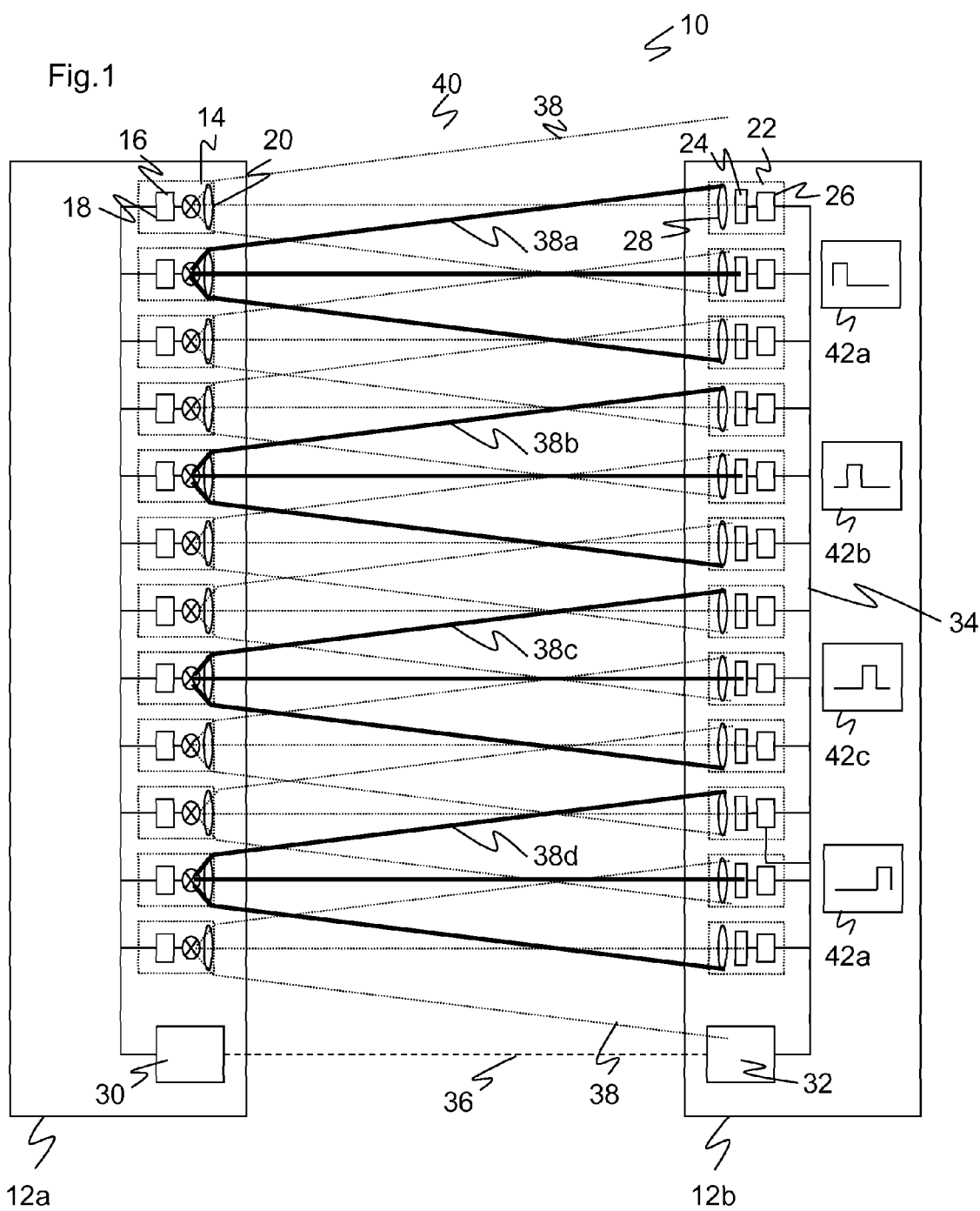
FIG. 1 a schematic sectional view of a light grid with monitoring light beams and a bus for communication of object detection signals in a time multiplex process.

FIG. 1 shows in a schematic sectional view a light grid 10, in particular an automation light grid. A bar-shaped transmission part 12a and a bar-shaped reception part 12b are opposite one another. The transmission part 12a has a plurality of light transmitters 14 each having a light source 16, for example an LED or a laser diode, a transmitter control 18 for activating the light source and a transmission optics 20. Correspondingly, a plurality of light receivers 22 are provided in the reception part 12b each associated with a light transmitter 14 and each having a light reception element 24, for example a photodiode, a light receiver control 26 and a reception optics 28. The transmission control 18 and the light receiver control 28 are configured, for example, as an ASIC (application specific integrated circuit) and, contrary to the representation, they can each be responsible for two or more light sources 16 or light reception elements 24.

A central control 30 at the transmission side is connected to the light transmitters 14 and a central control 32 at the reception side is connected to the light receivers 22. The connection is realized as a bus 34 at least at the reception side, in particular as a differential data bus. The bus 34 preferably has only a 1-bit data line. As shown by a dashed line 36, the two controls are connected to one another, with only an optical synchronization taking place instead of a line connection conceivable per se to avoid the cabling effort.

The light transmitters 14 and the light receivers 22 each span a monitoring light beam 38 between them and thus in their totality a two-dimensional, planar monitored field 40. The respective light receiver control 26 recognizes, for example using a threshold comparison of the measured reception intensity with a predefined switching threshold, whether the monitoring light beam 38 associated with it is interrupted by an object in the monitoring light beam 38 or not and, where applicable, outputs a corresponding object detection signal 42a-d over the bus 34 to the control 32 at the reception side. The switching signals 42a-d are evaluated in the control 32 at the reception side to provide a signal to an output, not shown, of the light grid 10 which indicates which monitoring light beams 38 are interrupted; depending on the embodiment also alternatively or additionally a switching signal whether a monitoring light beam 38 is interrupted at all.

As already explained in the introduction, the monitoring light beams expand as the spacing between the transmission part 12a and the reception part 12b increases and thus form beam cones or beam lobes. In exact terms, this applies both at the transmission side and at the reception side. However, only the transmission lobes are shown to simplify the representation. The actual monitored region of a monitoring light beam 38 is then the overlap region of the transmission lobe and the reception lobe.

Due to the expansion, the monitoring light beams 38 are not only registered by the associated light receiver 22, but also by its neighbors of a first order and, optionally, of a higher order. This effect is unwanted because the clear association of an object intrusion with a monitoring light beam 38 is thereby lost and an object intrusion can even be overlooked when a light receiver 22 receives an above-threshold reception light level by adjacent light transmitters 14 despite an interruption of the direct light path to the associated light transmitter 14.

For this reason, the control 30 at the transmission side and the control 32 at the reception side each only activate specific monitoring light beams 38a-d simultaneously in a group-wise parallel monitoring sequence. For this purpose, groups of monitoring light beams 38a-d are formed. The groups are not necessarily separated construction-wise, although such a modular light grid design is possible, but a corresponding association in the controls 30, 32 is rather sufficient.

The simultaneously activated monitoring light beams 38a-d are far enough apart so that cross-talk between monitoring light beams 38a-d is prevented due to the beam expansion. It is accordingly geometrically precluded that the transmission light lobe and the reception light lobe of an active light transmitter from one group and a simultaneously active light receiver of another group overlap. This is realized most simply via a minimum size of the groups in which the diameter of the transmission light lobes and of the reception light lobes is smaller than the spacing between the groups. This minimum size depends on the spacing between the transmission part 12a and the reception part 12b, but can simply be coordinated with the actual range or a maximum range. Again in other words, from a specific beam spacing onward, which is given by the radiation characteristic or by the reception characteristic, further sequential passes through the monitoring light beams 38 of the further groups having the monitoring light beams 38b-d are carried out in parallel with a first sequential pass through the monitoring light beams 38 of the first group having the monitoring light beam 38a.

The conventional purely sequential cycle is accelerated by a factor corresponding to the group number by the group-wise parallel monitoring sequence. However, a problem results when a plurality of the simultaneously active light receivers want to output an object detection signal 42a-d because then a plurality of switching signals collide on the 1-bit line of the bus. So that this bus conflict does not occur, the output of the objection detection signal 42a-d takes place at the end of each individual beam cycle via a short switching pulse. A different delay is associated with each monitoring light beam 38a-d. The light grid 10 is for this purpose preferably split into different regions having different delays which in particular correspond to the groups and each region uses a different delay. The evaluation can be designed in parallel by this time multiplexing and a bus of very small bandwidth can nevertheless be used.

The light intensity received in the light receiver control 26 is subject to a drift over the course of operation due to aging effects, contamination or temperature fluctuations. Thresholds can then be fallen below despite a free monitoring light beam 39. Provision is therefore made in a further preferred embodiment to track these switching thresholds in that changes of the reception intensity with a free light path are determined.

Figure 2:
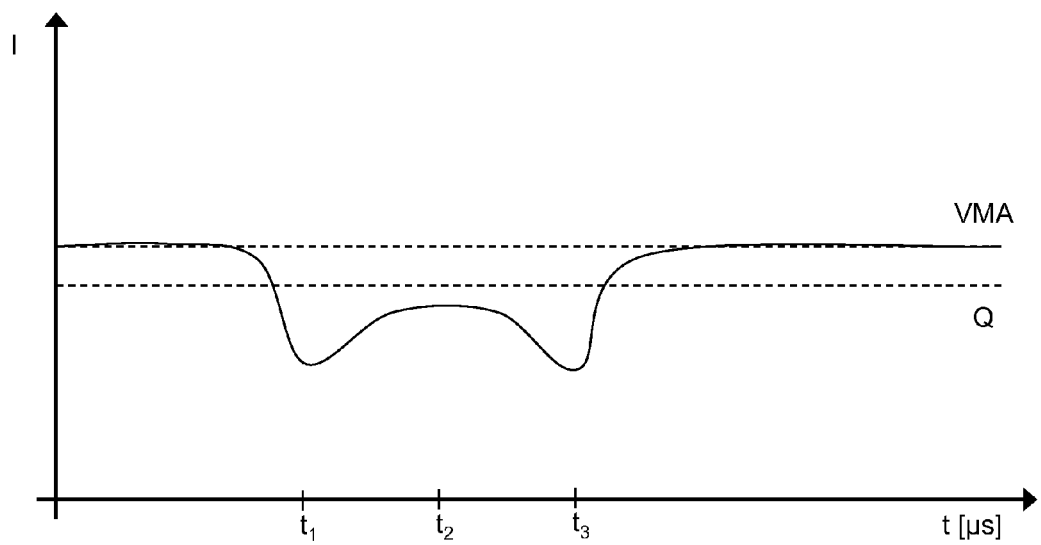
FIG. 2 an exemplary time-dependent intensity curve of a monitoring light beam on traveling through a transparent object.

This is particularly important when transparent objects are to be detected. FIG. 2 shows for explanation a purely exemplary time-dependent intensity curve for a monitoring light beam 38 on passing through a glass bottle. The reception level admittedly falls below the switching threshold marked by Q when the margin of the glass bottle moves into the monitoring light beam 18 at the time point $t_1$, but by no means as clearly due to the transparency as would be the case for an opaque object. If at a time $t_2$ the center of the glass bottle has entered into the monitoring light beam 38, the reception level increases even further because the glass bottle acts as a cylindrical lens. The reception level then drops once more at a time $t_3$ on passing through the other margin of the glass bottle.

Due to the short spacings between the reception level with the transparent object in the monitored light beam 38, the switching threshold has to be set very close to the reception level with a free light path. If now the general reception level drops due to drifting, incorrect switchings can occur.

To recognize this in good time, an additional prefailure threshold or tracking threshold VMA is monitored in addition to the switching threshold Q. This threshold is preferably placed exactly at the reception level of the free light paths and is free of hysteresis.

Figure 3:
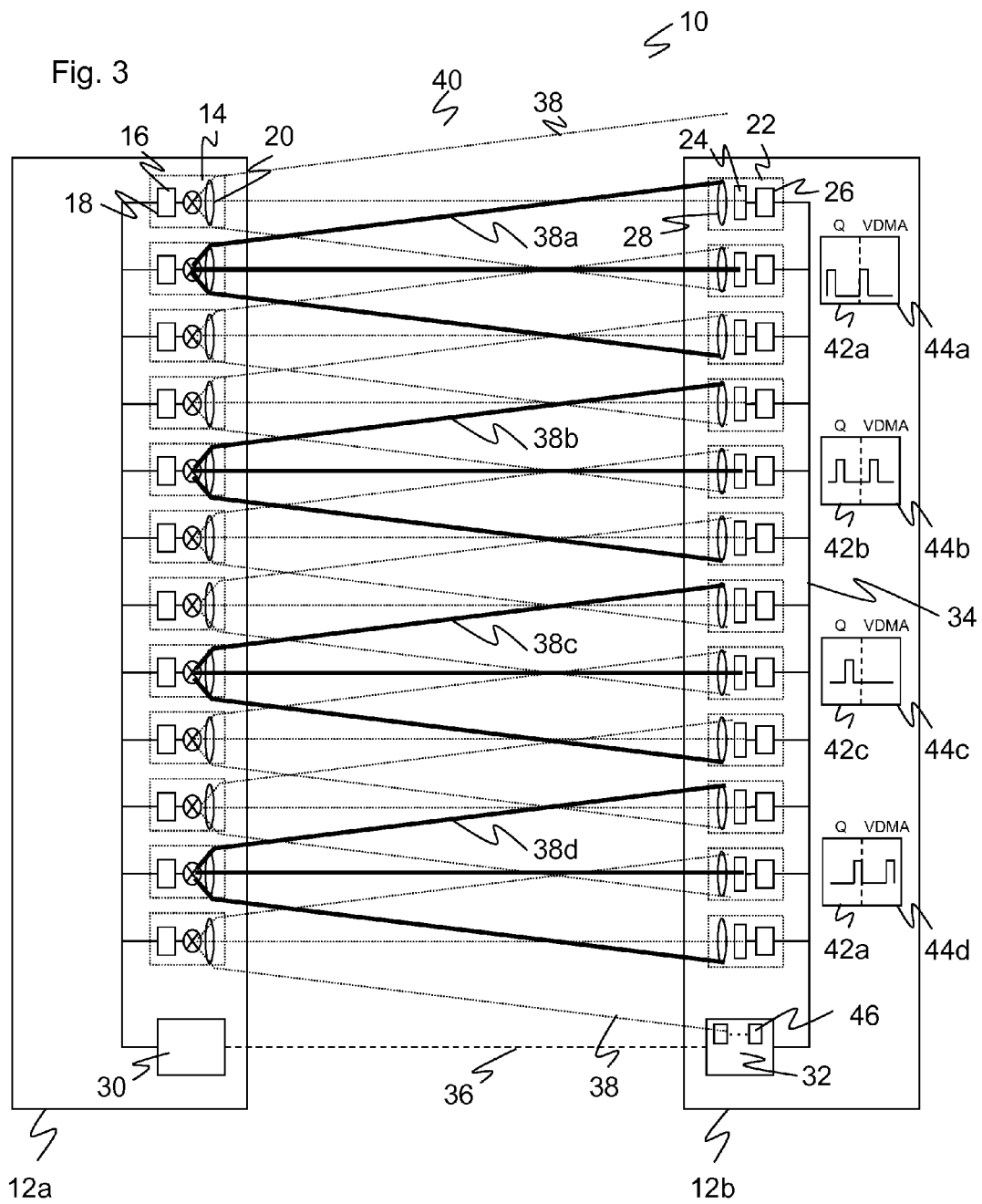
FIG. 3 a schematic sectional view of a light grid similar to FIG. 1 with additional communication of prefailure signals on a bus.

FIG. 3 shows in a sectional view similar to FIG. 1 an embodiment of a light grid 10 with additional threshold tracking. The light receiver controls 26 here not only output the object detection signal 42a-2, but additionally a prefailure signal or a tracking signal 44a-d as a result of a second threshold evaluation with the prefailure threshold VMA. Like the objection detection signal 42a-d, the prefailure signal is also preferably binary and is communicated over the bus 34 as a short switching pulse. For this purpose, a second bus or at least a separate bus line can be provided in principle. However, the prefailure signal 44a-d is preferably also communicated on the same 1-bit bus line as the object detection signal 42a-2. For this purpose, an additional delay is introduced which separates the object detection signals 42a-d and the prefailure signals 44a-d from one another. There is thus initially a time slot for the transmission of the object detection signals 42a-d marked by Q in the example of FIG. 3 and then a time slot for the transmission of the prefailure signals 44a-2 marked by VMA. This association of the delays and time slots is only particularly clear; other multiplexing schemes are equally conceivable. In principle, any desired specific delay, that is Q or VMA, can be predefined for each group and category so that the time slots can be swapped as desired.

The prefailure signals 44a-d are only transmitted as a 1-bit value so that the bus 34 can be formed with the smallest possible bandwidth. To evaluate the prefailure signals 44a-d in the control 32 at the reception side, a respective counter 46 which accumulates the prefailure signals 44a-d over a longer timer period is provided for each monitoring light beam 38 there.

Figure 4:
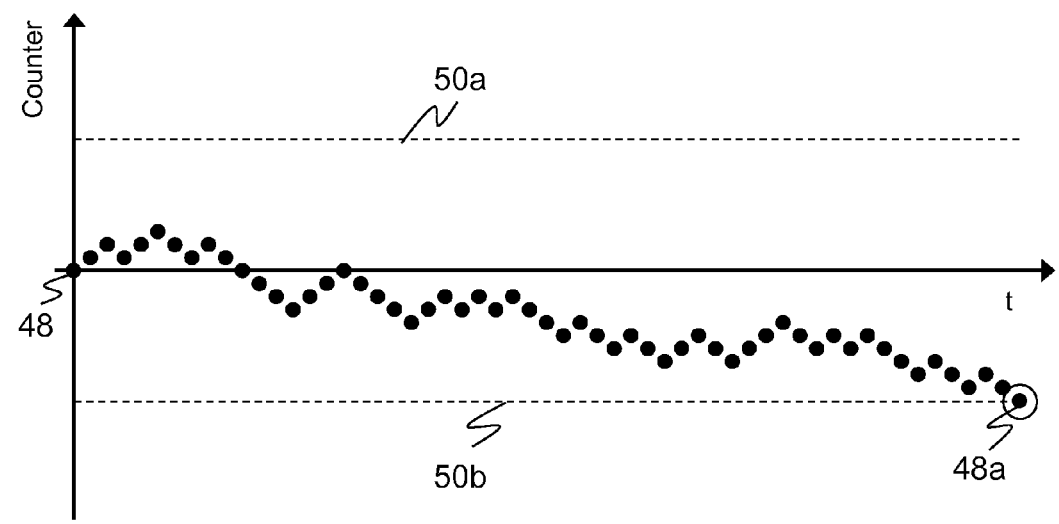
FIG. 4 an exemplary time curve of a counter which accumulates prefailure signals and for recognizing a drift.

FIG. 4 shows an exemplary time curve of such a counter 46 for a monitoring light beam 38. Each dot 48 stands for an activation cycle. The counter is initially initialized at zero. Whenever the associated light receiver control 26 measures a reception level above the prefailure threshold, a prefailure signal 44a, 44b, 44d having the binary value one is received and the counter is incremented. Accordingly, on a reception level beneath the prefailure threshold, a prefailure signal 44c having the binary valued zero is received and the counter is decremented. With pure signal noise, the prefailure signal 44a-d is statistically distributed; the counter consequently fluctuates around zero on average. With a drift, that is a systematic change of the reception level with a free light path, the counter tends to move upward or downward in accordance with the drift direction, with the more common case being a signal attenuation.

In this respect, as soon as a default counter level set as a threshold 50a-b is exceeded or fallen below, at point 48a in the example of FIG. 4, an adaptation of the switching threshold Q and of the prefailure threshold VMA takes place in the associated light receiver control 26. The control 32 at the reception side 32 preferably communicates this over the bus 34 to the light receiver control 26. Both the switching threshold Q and the prefailure threshold VMA are tracked by this process.

The threshold tracking described in connection with FIGS. 2 to 4, in particular for the recognition of transparent objects, admittedly also profits from the cycle shortening by a group-wise parallel monitoring frequency. The threshold tracking can, however, also be used independently of the group-wise parallel monitoring frequency. Specifically for short light grids 10 with relatively few monitoring light beams 38, a conventional purely sequential activation cycle through all monitoring light beams is also sufficient.

The invention claimed is:

1. A light grid (10) having a plurality of light transmitters (14) for transmitting a respective monitoring light beam (38) and having a plurality of associated light receivers (22) to generate an object detection signal (42a-d) depending on the reception of the monitoring light beam, having a control (30, 32) which is configured to divide the monitoring light beams (38) into groups and to consecutively activate the monitoring light beams (38) of the groups, wherein, in a group-wise parallel monitoring sequence, a respective monitoring light beam (38) of each group is activated in parallel, as well as having a first bus (34) via which the object detection signals can be output to the control (32) by the light receivers (22, 26),
wherein the light receivers (22, 26) are configured to output the object detection signals to the control (32) in a time multiplex process,
the object detection signal (42a-d) is a switching pulse, the time multiplex process is implemented by a delay applied to the switching pulse, and the delay is a delay common to all monitoring light beams (38) of a group and a delay differing between the groups.

2. The light grid (10) in accordance with claim 1, wherein the first bus (34) has only a 1-bit line for object detection signals (42*a-d*).

3. The light grid (10) in accordance with claim 1, wherein the object detection signal (42*a-d*) is acquired by comparison of the reception intensity of the monitoring light beam (38) in the light receiver (22, 26) with a switching threshold.

4. The light grid (10) in accordance with claim 3, wherein the control (32, 26) is configured to track the switching threshold dynamically.

5. The light grid (10) in accordance with claim 1, wherein the control (32) is configured to accumulate the binary prefailure signals (44*a-d*) per monitoring light beam (38) in a counter (46) and to adapt at least one of the switching threshold and the prefailure threshold if a preset count is exceeded or fallen below.

6. A method of monitoring a monitored zone (40) comprising:
   a plurality of monitoring light beams (38) which, divided into groups, are consecutively activated to generate an object detection signal (42*a-d*) depending on whether a monitoring light beam (38) is interrupted, wherein, in a group-wise parallel monitoring sequence, a respective monitoring light beam (38) of each group is activated in parallel and the object detection signals (42*a-d*) are transmitted to a control (32) via a bus (34), and
   transmitting the object detection signals (42*a-d*) in a time multiplex process on the bus (34), wherein,
   the dropping of the reception signal with a free light path is recognized using a threshold comparison of the reception intensity of the monitoring light beam (38) with a prefailure threshold and is output to the control (32) via a binary prefailure signal (44*a-d*), wherein the binary prefailure signals (44*a-d*) are accumulated in a counter (46) and a switching threshold for generating the object detection signal (42*a-d*) and/or the prefailure threshold is/are adapted when a default prefailure count (50*a-b*) is exceeded or fallen below.

7. The method in accordance with claim 6, wherein the step of transmitting the object detection signals (42*a-d*) in a time multiplex process on the bus (34) is effected with only a 1-bit line.

8. The method in accordance with claim 6, wherein the prefailure signal (44*a-d*) is transmitted to the control (32) via a second bus (34).

9. The method in accordance with claim 8, wherein the first bus and the second bus are configured as a common bus (34) in which the same 1-bit line is used by a time multiplex process for the transmission of both the object detection signals and the prefailure signals (44*a-d*).

10. A light grid (10) having a plurality of light transmitters (14) for transmitting a respective monitoring light beam (38) and having a plurality of associated light receivers (22) to generate an object detection signal (42*a-d*) depending on the reception of the monitoring light beam, having a control (30, 32) which is configured to divide the monitoring light beams (38) into groups and to consecutively activate the monitoring light beams (38) of the groups, wherein, in a group-wise parallel monitoring sequence, a respective monitoring light beam (38) of each group is activated in parallel, as well as having a first bus (34) via which the object detection signals can be output to the control (32) by the light receivers (22, 26),
   wherein the light receivers (22, 26) are configured to:
   (i) output the object detection signals to the control (32) in a time multiplex process;
   (ii) recognize a dropping of the reception level with a free light path using a threshold comparison of the reception intensity of the monitoring light beam (38) with a prefailure threshold;
   (iii) output the dropping of the reception level with a free light path as a binary prefailure signal (44*a-d*) depending on the result of the threshold comparison; and
   (iv) accumulate the binary prefailure signals (44*a-d*) in a counter (46) and to adapt at least one of the switching threshold and the prefailure threshold if a preset count is exceeded or fallen below.

11. The light grid (10) in accordance with claim 10, further comprising a second bus (34) in order to communicate the prefailure signal (44*a-d*) from the light receivers (22, 26) to the control (32).

12. The light grid (10) in accordance with claim 11, wherein the prefailure signal (44*a-d*) from the light receivers (22, 26) communicated to the control (32) is communicated with only a 1-bit line for the prefailure signal (44*a-d*).

13. The light grid (10) in accordance with claim 11, wherein the first bus and the second bus are configured as a common bus (34).

14. The light grid (10) in accordance with claim 13, wherein the common bus (34) for the communication of the object detection signal (42*a-d*) and of the prefailure signal (44*a-d*) only has a single 1-bit line in which the object detection signal (42*a-d*) and the prefailure signal (44*a-d*) have a different time offset.

* * * * *